United States Patent
Bo

(10) Patent No.: US 8,571,613 B1
(45) Date of Patent: Oct. 29, 2013

(54) WEATHERPROOF RADIO RECEIVER

(75) Inventor: Lv Bo, Shenzhen (CN)

(73) Assignee: Prospec Electronics of S.C., Inc., Mt. Pleasant, SC (US)

( * ) Notice: Subject to any disclaimer, the term of this patent is extended or adjusted under 35 U.S.C. 154(b) by 62 days.

(21) Appl. No.: 13/298,773

(22) Filed: Nov. 17, 2011

(51) Int. Cl.
*H04M 1/00* (2006.01)

(52) U.S. Cl.
USPC .................. 455/575.9; 455/90.3; 455/345

(58) Field of Classification Search
USPC ............. 455/90.1–90.3, 128, 344, 345, 347, 455/550.1, 575.1, 575.9
See application file for complete search history.

(56) References Cited

U.S. PATENT DOCUMENTS 6,810,233 B2 * 10/2004 Patsiokas .................. 455/3.02
2006/0050903 A1 * 3/2006 Chan ........................ 381/124

* cited by examiner

*Primary Examiner* — Nhan Le
(74) *Attorney, Agent, or Firm* — B. Craig Killough; Barnwell Whaley Patterson & Helms, LLC

(57) ABSTRACT

A radio receiver having a substantially round housing that does not exceed 7.95 cm in diameter. A front display panel having a somewhat larger perimeter than the housing is mounted to the housing. The housing and the front display panel form a weatherproof unit that meets IP66 standards. A radio receiver and an amplifier are contained within the weatherproof housing, which shields electrical circuits from precipitation and other forms of water intrusion.

12 Claims, 2 Drawing Sheets

WEATHERPROOF RADIO RECEIVER

FIELD OF THE INVENTION

This invention relates to radio receivers generally, and is more specifically directed to a radio receiver that is contained within a weatherproof housing.

BACKGROUND OF THE INVENTION

Many vehicles are used in outdoor applications that subject the interior of the vehicle to precipitation, or to bodies of water ranging from puddles to moving rivers. The interior of the vehicle may be subject to rain or melting snow, and the motion of the vehicle further subjects the interior of the vehicle, and electronic components in the vehicle, to the precipitation. Similarly, the motion of the vehicle through puddles, or across streams or similar bodies of water, can force the water into the vehicle, and subject electronic components including those mounted on the dashboard, to water damage.

The vehicles that are used in environments where the interior is subject to wet environments include tractors, four-wheelers, four-wheel drive vehicles, construction vehicles, boats and similar marine vehicles. Such vehicles frequently do not have radio receivers for receiving broadcast radio, such as AM and FM radio signals. Due to the rugged and rough conditions associated with the use of these outdoor vehicles, such devices are not deemed to be practical.

There is a need for a self-contained radio receiver that can be mounted in vehicles for outdoor use, wherein the interior of the vehicle is subject to water intrusion and other wet conditions. The device should be small and self-contained, and easily mounted in the dashboard, or within an easily formed, and relatively small hole in the interior of the vehicle. The device is also useful for mounting in other environments where water is a factor, such as spas and hot tubs.

SUMMARY OF THE INVENTION

The present invention is a radio receiver having a substantially round housing that does not exceed 7.95 cm in diameter. A front display panel having a somewhat larger perimeter than the housing is mounted to the housing. The housing and the front display panel form a weatherproof unit that meets IP66 standards. A radio receiver and an amplifier are contained within the weatherproof housing, which shields electrical circuits from precipitation and other forms of water intrusion.

DESCRIPTION OF PREFERRED EMBODIMENTS

Figure 1:
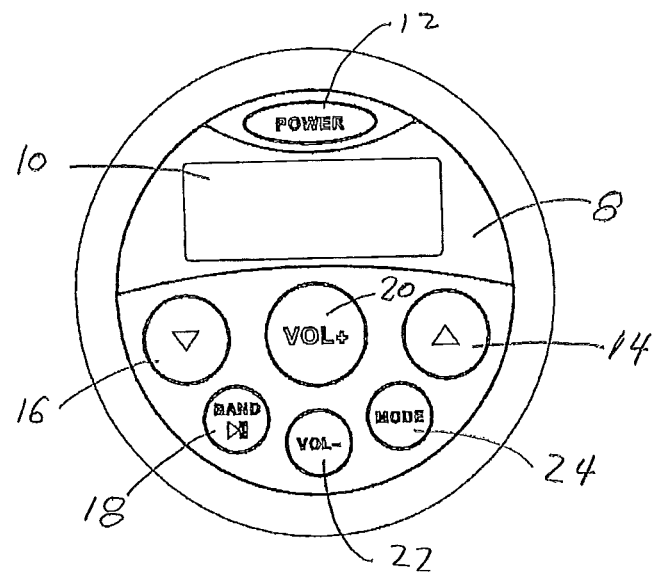
FIG. 1 is an elevation of the front display panel of the device.
Figure 2:
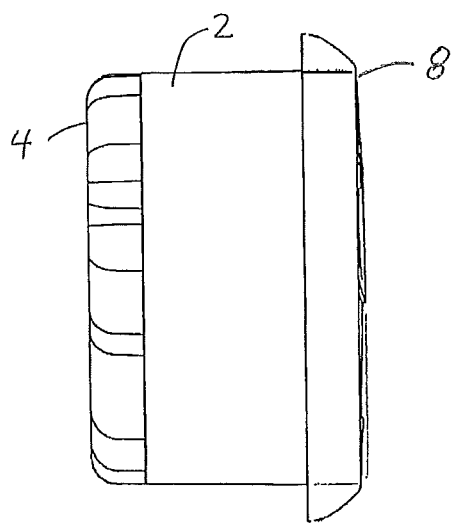
FIG. 2 is a side elevation of the device, showing the front panel, the housing, and the back of the housing.
Figure 3:
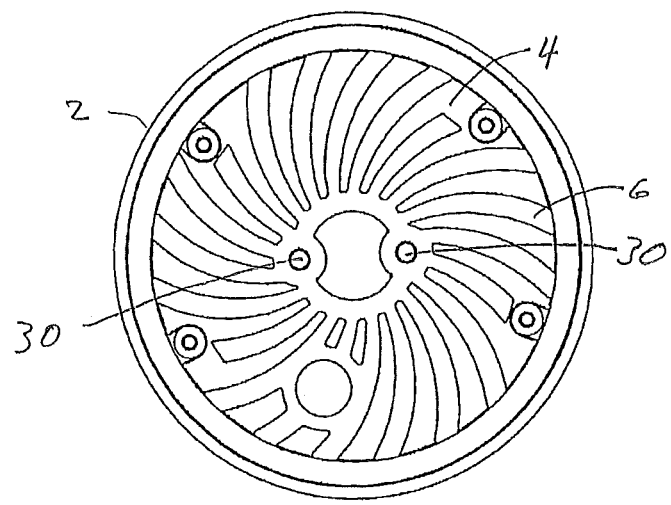
FIG. 3 is an elevation showing the back of the housing.

The radio receiver is preferred to have a substantially round housing 2 as shown in the drawing figures. The housing contains a radio tuner and an amplifier.

Since the housing that is adjacent to the front display panel is mounted within a hole or void formed in a dashboard of a vehicle in most application, there is no ventilation within the housing itself. Further, since the housing and front display panel forms a waterproof enclosure for the radio receiver, the enclosure must be generally sealed to prevent water from entering the housing. At the same time, draining heat from the device is important to the longevity of the device.

The housing comprises a metal back 4 in one embodiment. The back is preferred to be formed of heat conductive metal, with the metal acting as a heat sink to drain and disperse heat from the electronic circuits contained in the housing. The backing may be formed of aluminum. The backing is preferred to be formed with peaks and valleys 6, or heat dissipating fins, so that the surface provides heat dissipation.

A front display panel 8 is mounted to the housing, forming the waterproof enclosure for the electronic circuits. The front display panel, in the embodiment shown, comprises controls for the radio tuner and the amplifier, and a display, which may be an LCD display 10, that digitally indicates the radio frequency to which the radio tuner is tuned.

Controls may comprise a master on/off, or power, switch 12. Controls for the tuner may include controls 14,16 for increasing or decreasing the reception frequency of the tuner, and a switch 18 for selecting frequency bands, such as switching from AM to FM frequencies. The amplifier controls 20,22 may include volume controls for increasing or decreasing amplification of the signals to the amplifier, and a switch 24 for switching between modes of input to the amplifier.

In one embodiment, the device has a direct current input for powering the device. In this embodiment, an input is provided for powering the radio tuner and amplifier by current provided by the vehicle. For example, the current input may be 12 volts direct current (DC) provided by the vehicle's electrical system, but could be constructed for vehicles operating on 24 volt systems. If the device is located near an AC source, a transformer may be provided to convert the current to DC. A signal output is also provided which is connected to a speaker. The signal from the amplifier is then conveyed to the speaker, so that the radio or other electronic device may be heard.

In a simplest embodiment, the device has a single speaker output. In another embodiment of the device, the radio tuner and amplifier provide stereo output to two (2) speakers comprising a right channel and a left channel. In another embodiment, an auxiliary input is provided that receives a signal from another electronic device, such an MP3 player or other digital source, and a particularly, a digital music source. A small digital analog converter is provided within the unit. A control available on the front display panel allows the device to be switched between the radio tuner and the input for the digital signal, with the amplifier amplifying the signal from the deck or the tuner to speaker or speakers. In another embodiment, the auxiliary input is provided by a Universal Serial Bus (USB), which may connected to a digital signal source, such as a computer or other source of digital files.

Figure 4:
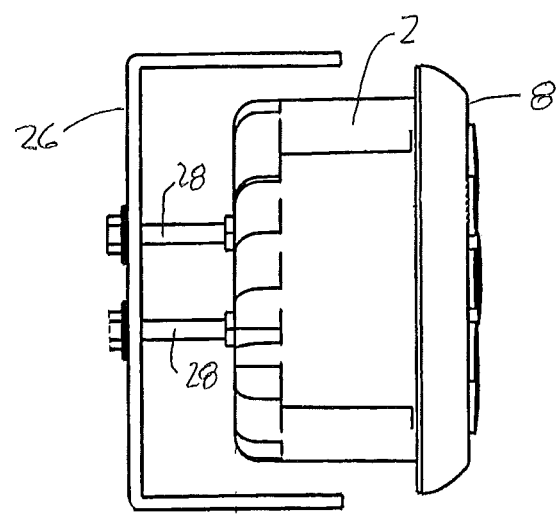
FIG. 4 is a top, plan view of the device, with an embodiment of a mounting bracket in place.

The radio tuner and amplifier, and if used, the digital to analog converter, are positioned within the housing, which is preferred to be substantially round in cross section, and to have a diameter of no larger than 7.95 cm. The depth of the device from the back of the display to the opposite end of the housing should not be more than 55 mm, although studs may extend an additional length from opposite sides of the housing for mounting of the device, through the use of a U shaped bracket that connects to the studs. FIG. 4. The circuitry contained within the waterproof enclosure must therefore be miniaturized and small enough to be contained within the housing.

In use, the device is mounted in a round or substantially round opening in a dashboard of a vehicle, which may already be present in the vehicle. Even if the opening is not present, it is simple matter to form a relatively small hole or void that will receive the radio receiver. The device will usually be mounted in a location where current from the vehicle is readily available. It is then simply a matter of installing and attaching a speaker or speakers to the speaker output from the device.

In one embodiment, the device may be mounted through the use of a U bracket 26 and studs 28. The studs are mounted to the back 4 of the device at threaded mounting points 30. The studs are preferred to be threaded for engagement to the device. The U bracket may be secured to a vehicle or other object to which the device is mounted. The entire depth of the device is preferred to not exceed 70 mm with U bracket in place. In the embodiment shown in FIG. 4, the U bracket is mounted to the metal back and extends beyond the housing at the back of the housing and at sides of the housing. The width of the metal bracket is preferred to not exceed 99 mm.

What is claimed is:

1. A radio receiver, comprising:
   a substantially round housing comprising a thermally conductive metal back having thermally conductive peaks and valleys that form an irregular surface, and wherein the thermally conductive metal back forms a heat sink that thermally communicates with electronic circuits contained in the housing;
   a front display panel mounted to the substantially round housing, the front display panel having a perimeter that extends beyond a circumference of the substantially round housing at all points, the front display panel comprising a display for a radio tuner and comprising a plurality of controls for the radio tuner and for an amplifier;
   the radio tuner contained within the substantially round housing;
   an amplifier contained within the substantially round housing, wherein the amplifier receives a signal from the radio tuner;
   the substantially round housing and the display panel forming a weatherproof enclosure for the radio tuner and the amplifier that meets IP 66 standards.

2. The radio receiver as claimed in claim 1, further comprising an input that receives a signal from an electronic device, wherein the input is connected to the amplifier.

3. The radio receiver as set forth in claim 1, further comprising an output for an amplified signal received from the amplifier.

4. The receiver as set forth in claim 1, further comprising a universal serial bus input as an input that receives a signal from an electronic device, wherein the universal serial bus input is connected to the amplifier.

5. The radio receiver as set forth in claim 1, further comprising threaded openings in the metal back, and threaded studs that engage the openings and engage a U bracket, wherein the U bracket is mounted to the metal back and extends beyond the substantially round housing at the back and at sides of the substantially round housing.

6. The radio receiver as set forth in claim 1, wherein the diameter of the substantially round housing does not exceed 7.95 cm.

7. A radio receiver, comprising:
   a substantially round housing comprising a metal back having an irregular surface and the substantially round housing comprising threaded openings in the metal back;
   a front display panel mounted to the substantially round housing, the front display panel having a perimeter that extends beyond a circumference of the substantially round housing at all points, the front display panel comprising a display for a radio tuner and comprising a plurality of controls for the radio tuner and for an amplifier;
   the radio tuner contained within the substantially round housing;
   an amplifier contained within the substantially round housing, wherein the amplifier receives a signal from the radio tuner;
   the substantially round housing and display panel forming a weatherproof enclosure for the radio tuner and the amplifier; and
   threaded studs that engage the threaded openings in the metal back and engage a U bracket, wherein the U bracket is mounted to the metal back and extends beyond the substantially round housing at the back and at sides of the substantially round housing.

8. The radio receiver as claimed in claim 7, further comprising an input that receives a signal from an electronic device, wherein the input is connected to the amplifier.

9. The radio receiver as set forth in claim 7, further comprising an output for an amplified signal received from the amplifier.

10. The radio receiver as set forth in claim 7, further comprising a universal serial bus input as an input that receives a signal from an electronic device, wherein the universal serial bus input is connected to the amplifier.

11. The radio receiver as set forth in claim 7, the metal back having thermally conductive peaks and valleys that form an irregular surface, and wherein the metal back forms a heat sink that thermally communicates with electronic circuits contained in the housing.

12. The radio receiver as set forth in claim 7, wherein the diameter of the substantially round housing does not exceed 7.95 cm.

* * * * *